United States Patent
Muraki et al.

(10) Patent No.: US 6,709,162 B2
(45) Date of Patent: Mar. 23, 2004

(54) ROLLING BEARING UNIT (75) Inventors: Hiromitsu Muraki, Fujisawa (JP); Norihiro Aoki, Fujisawa (JP); Norikazu Kitagawa, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/011,267

(22) Filed: Dec. 6, 2001

(65) Prior Publication Data

US 2002/0085780 A1 Jul. 4, 2002

(30) Foreign Application Priority Data

Dec. 6, 2000 (JP) .......... 2000-371064
Apr. 27, 2001 (JP) .......... 2001-131468

(51) Int. Cl.$^7$ .............................. F16C 43/04
(52) U.S. Cl. .............. 384/504; 29/898.07; 29/898.09
(58) Field of Search ............... 384/499, 500, 384/501, 504, 510, 513, 516, 517, 537, 543; 29/898.07, 898.09

(56) References Cited

U.S. PATENT DOCUMENTS 5,509,198 A * 4/1996 Takamizawa et al. .... 29/898.09
5,524,343 A * 6/1996 Blanks .................... 29/898.09
6,202,306 B1 * 3/2001 Miyazaki ................. 29/898.09
6,322,254 B1 * 11/2001 Schwinghammer et al. 384/537

FOREIGN PATENT DOCUMENTS

JP 07-111053 4/1995

* cited by examiner

Primary Examiner—Thomas R. Hannon
(74) Attorney, Agent, or Firm—Katten Muchin Zarvin Rosenman (57) ABSTRACT A rolling-bearing unit comprising a pair of bearing assembled such that the tolerance range of the radial clearance or contact angle of the ball bearings is divided into a plurality of divisions, and that a pair of ball bearings is selected from the same division, and that a pre-load, which is set according to the division, is applied to the selected pair of ball bearings as they are installed in the unit.

7 Claims, 9 Drawing Sheets

ROLLING BEARING UNIT

BACKGROUND OF THE INVENTION

1. Field of the Invention

This invention relates to a rolling-bearing unit, and more particularly to a rolling-bearing unit that is used in a location where there is high-speed and minute-rocking motion, for example, as in the bearing unit for the swing arm of a magnetic disk apparatus such as a Hard Disk Drive Apparatus (HDD), Flexible Disk Drive Apparatus (FDD), and also to a rolling-bearing unit with its radial rigidity controlled to a desired value for use in the magnetic disk apparatus.

2. Description of the Prior Art

Figure 1:
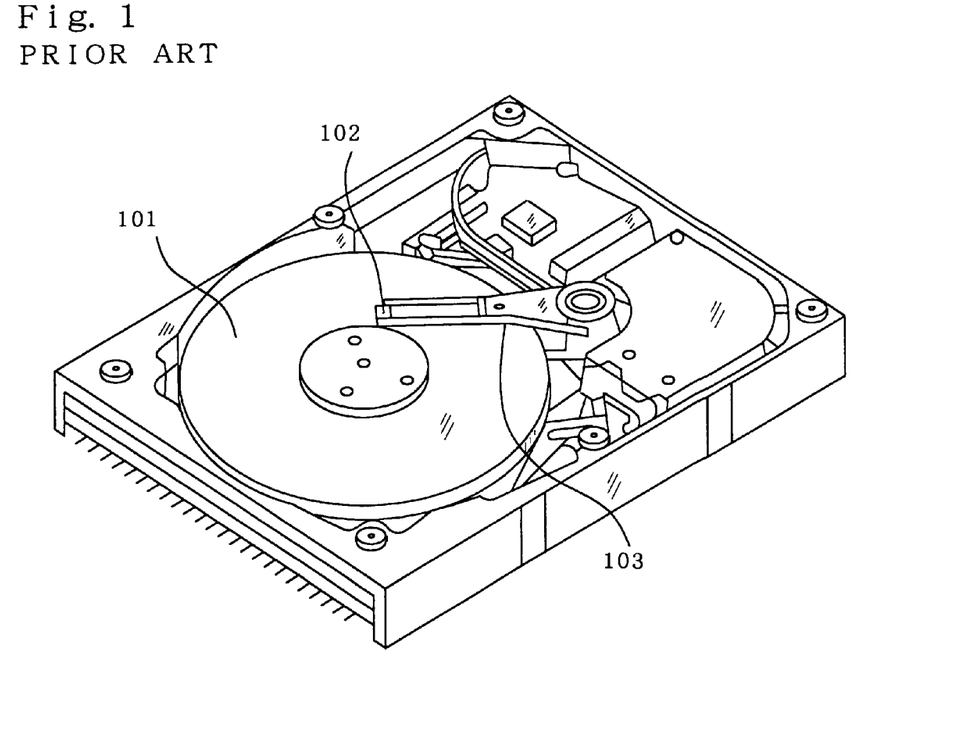
FIG. 1 is a perspective view of an example of the HDD with its cover removed wherein a swing arm is supported by a rolling bearing unit to which the present invention is applied.

As shown in Japanese Patent Publication No. TokuKai Hei 7-1 11053, the HDD for use in the memory device of computers etc. has a structure as shown in FIG. 1. When the HDD is used, the hard disk 101 is rotated at a high speed by an electric motor of the direct drive type. The swing arm 103 has a head 102 at its tip end, and is supported at its base end by a rolling bearing unit 104 as shown in FIG. 2 so that it swings with respect to the support shaft parallel to the rotation shaft of the hard disk 1.

Figure 2:
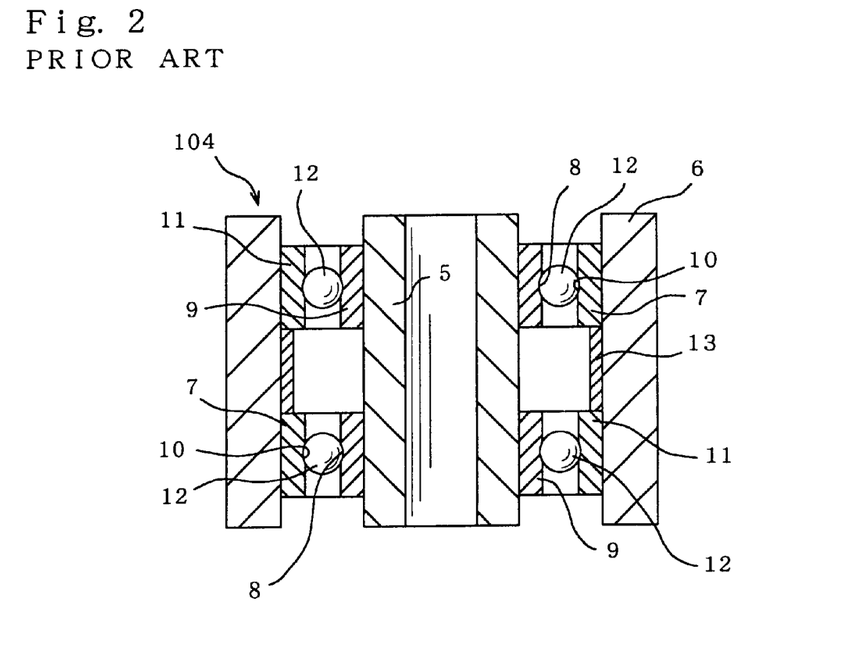
FIG. 2 is a cross sectional view of an example of the rolling bearing unit to which the present invention is applied.

The rolling bearing unit 104 as shown in FIG. 2 comprises an inner member or inner tube 5 in a cylindrical shape, an outer member or outer tube 6 in a cylindrical shape provided around the inner tube 5, and a pair of ball bearings 7 for supporting the inner tube 5 and the outer tube 6 such that they rotate relative to each other. The ball bearings 7 have an inner race 9 having an inner ring raceway 8 of a deep groove type or angular type formed on its outer peripheral surface, an outer race 11 having an outer ring raceway 10 of a deep groove type or angular type formed on its inner peripheral surface, and a plurality of rolling elements or balls 12 rotatively provided between the inner ring raceway 8 and the outer ring raceway 10. The balls 12 are rollably retained by a cage (not shown). In addition, although not illustrated, as required, the outer race 11 is formed with an attachment groove at the opposite ends of the inner peripheral surface generally along the circumference, and a shield plate is provided to have its outer peripheral edge attached to the attachment groove, so that the grease is prevented from leaking out of the space where the balls 12 are provided.

Figure 3:
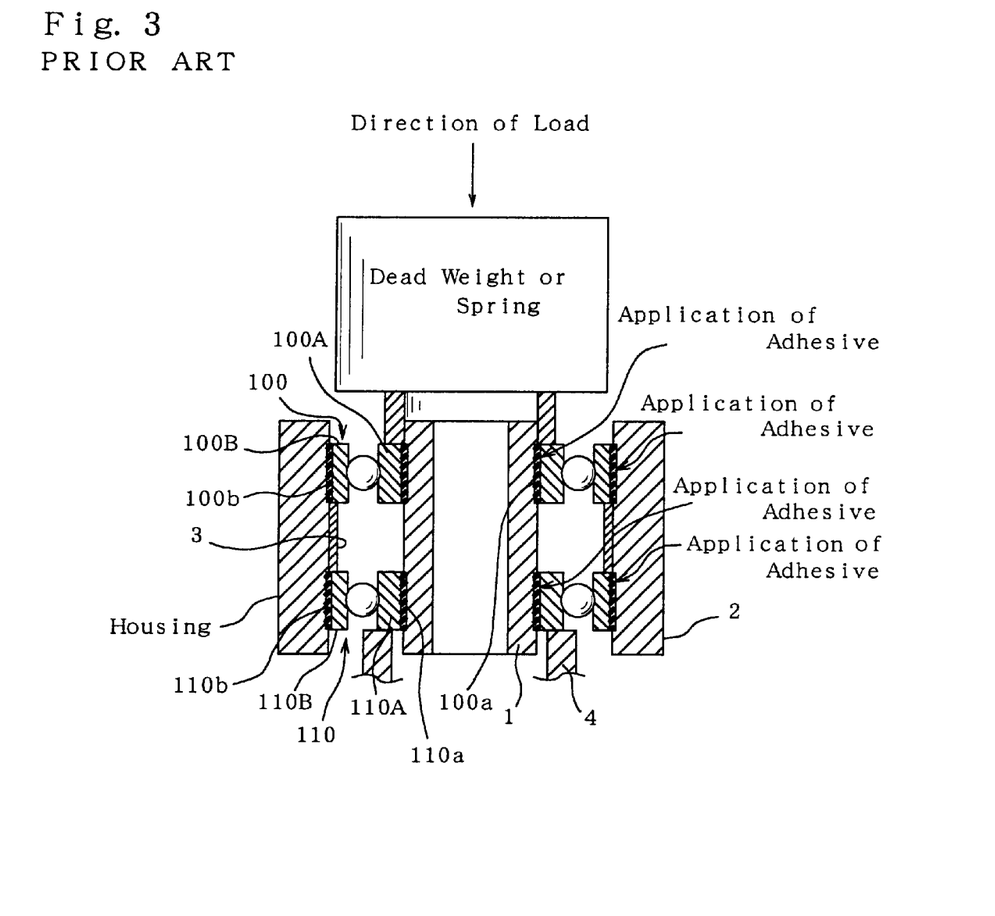
FIG. 3 is a cross sectional view to show a construction example of the conventional production method.

As shown in FIG. 3, a conventional bearing unit for the swing arm comprises a pair of ball bearings 100, 110 which are filled with grease, wherein a swing arm (not shown in the figure) is driven in a minute-rocking motion by a drive motor (not shown in the figure) having a rotor and a stator, and this swing arm is attached to a shaft 1 that is fastened on the inner periphery of the inner races 100A, 110A of the pair of ball bearings 100, 110, and a housing 2 is fastened around the outer periphery of the outer races 100B, 110B of the pair of ball bearings 100, 110.

This conventional rolling bearing unit is assembled such that it is possible to apply a pre-load to the pair of ball bearings 100, 110 in order to give them a specified radial rigidity, and such that it is possible to control runout of the shaft and achieve a specified positioning precision.

As shown in FIG. 3, in the assembly method for such a conventional rolling bearing unit, the lower end surface of the inner race 110A is supported by a jig 4, and a specified load from dead weight or spring force is applied to the upper end surface of the inner race 100A, then using a spacer 3, the position on the outer races 100B, 110B is fixed, and in this way a specified pre-load is applied by bringing the inner race 100A relatively close to the inner race 100A.

In this state, it is then possible to attach the outer peripheral portion of the shaft 1 with the inner peripheral surfaces 100a, 100a of the inner races 100A, 110A using adhesive or the like, as well as it is possible to attach the inner peripheral portion of the housing 2 with the outer peripheral surfaces 100b, 110b of the outer races 100B, 110B, also using adhesive or the like.

However, recently, there is an increasing demand for higher density magnetic disk apparatus.

Therefore, the width of the tracks on which signals are recorded on the disk has become narrower, and thus there is an even larger demand that the swing arm, in which the head for recording or reproducing the signals is mounted, be able to move at higher access speed to the target track and with improved positioning precision (faster and more precise control in positioning).

Therefore, together with an increasing demand for more rigidity of the ball bearing (rolling bearing) that supports the swing arm, there is a need to decrease the variation in rigidity between individual parts.

However, for a conventional rolling bearing unit for a swing arm, two bearings were selected from a bearing group, which were manufactured to fit within the tolerance range for a typical radial clearance, and with the method described above, the rolling bearing unit was assembled such that specified dead weight or spring force was applied in order to obtain the desired radial rigidity, however, there was a relatively large variation in the radial clearance and in the rate of curvature of the groove in the inner and outer races, so a relatively large variation in the rigidity between individual parts occurred.

It is thought to be possible to further increase the processing precision, so as to reduce the variation in the radial clearance and in the rate of curvature of the groove in the inner and outer races, and control the variation in the radial rigidity with a specified range, however, to at the present time, to actually do so would increase costs, that it is hard to adopt this way.

The ball bearings 7 in FIG. 2 and ball bearings in FIG. 3 have a similar structure. And, the following is a description referring to FIG. 2 only.

The ball bearings 7 as shown in FIG. 2 have a spacer 13 held between the outer races 11 which are fitted into the inner peripheral surface of the outer tube 6 and fixed with adhesion at two locations axially spaced apart from each other. In addition, the inner races 9 are fitted onto the outer peripheral surface of the inner tube 5 and fixed with adhesion at two locations axially spaced apart from each other in the state where a dead weight 14 is mounted on the vertically upper one of the inner races 9 or in the state where an axial load is applied to the inner races 9 in order that they come to each other. Accordingly, a pre-load is applied to the balls 12 at a contact angle in the opposite directions (face-to-face or back-to-back combination). The reason of applying the pre-load to the ball bearings 7 is to secure the rigidity of the ball bearings 7 and to improve the rotation precision.

Figure 5:
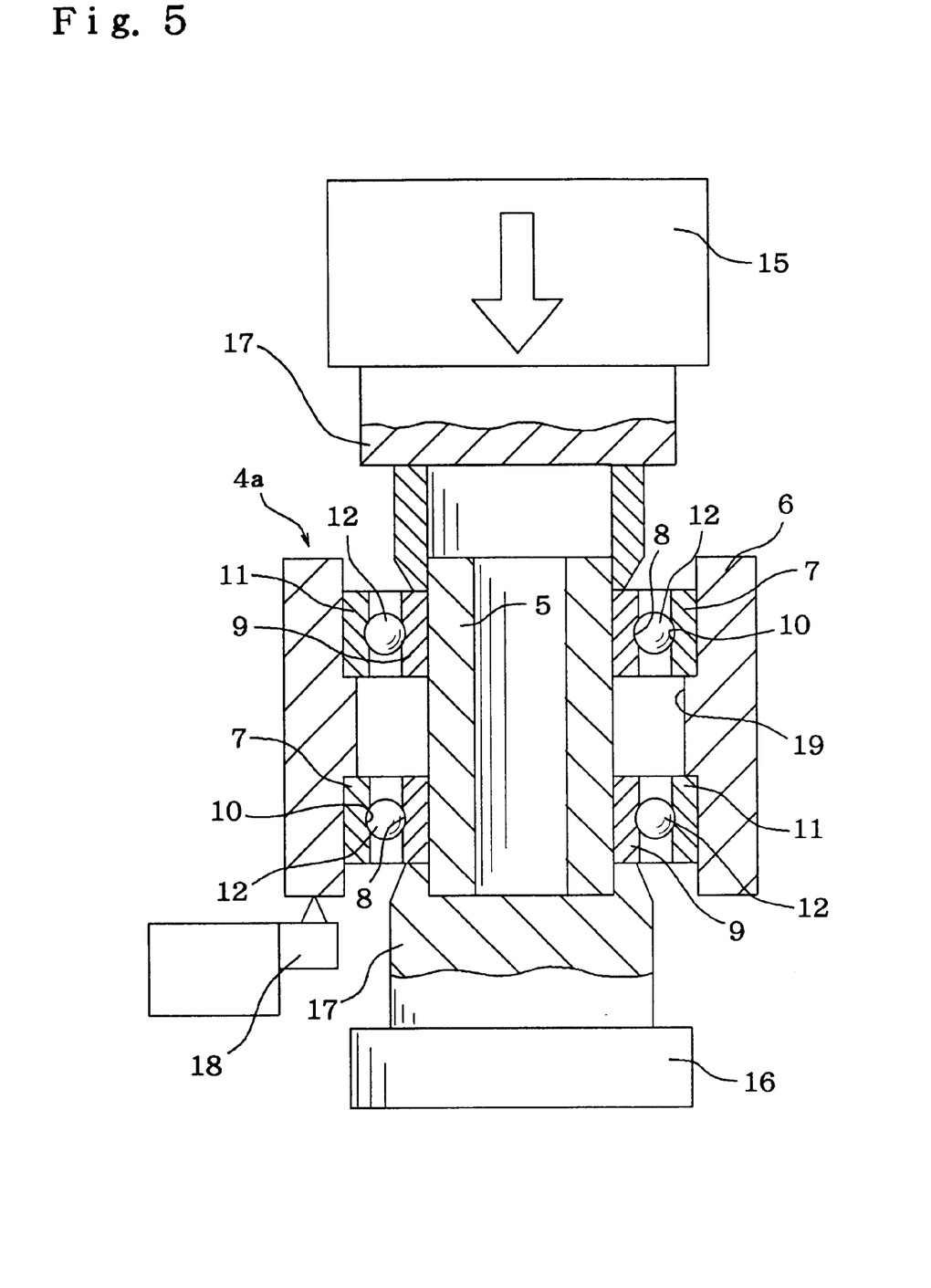
FIG. 5 is a cross sectional view to show the steps to produce a rolling bearing unit to which the present invention is applied.

In order to produce the rolling bearing unit with the pre-load controlled at an optimum value, the dead weight 14 or a spring, or a method as shown in FIG. 5, detailed later, is used to apply the predetermined axial load to the inner races 9. In the method of FIG. 5, the ball bearings 7 of the rolling bearing unit 4a are pressed in between the inner tube 5 and the outer tube 6 while the axial resonance frequency of the rolling bearing unit 4a is measured. And, at the point when the axial resonance frequency has reached a predetermined value, the ball bearings 7 are fixed between the inner tube 5 and the outer tube 6.

Specifically, the inner races 9 of the ball bearings 7 are pressed by a minute-motion feeding apparatus 15 so that they come close to each other while vibration is applied to the inner races 9 and the inner tube 5 by vibrators 17 provided between the lower surface of the minute-motion feeding apparatus 15 and the upper surface of a stage 16 provided with a load cell. Simultaneously, the axial resonance frequency of the rolling bearing unit 4a is measured by a sensor 18 which is provided in contact with or adjacent to a side surface of the outer tube 6. When the axial resonance frequency has reached a predetermined value, pressing the inner races 9 and therefore press-fitting the ball bearings 7 are stopped. It is possible to secure the axial rigidify at a desired value in the method of controlling the axial resonance frequency at a predetermined value because the axial rigidity corresponds to the axial resonance frequency. Also, it is possible to make the assembling process simple and easy because the ball bearings 7 are fitted to the inner tube 5 and the outer tube 6 in an interference fit relation. In the case of FIG. 5, in lieu of the spacer 13 in FIG. 2, a radially inward protrusion 19 is provided generally circumferentially on the inner peripheral surface of the outer race 6 at its middle portion.

In order to support the base end of the swing arm 103 (FIG. 1) with the rolling bearing unit 104, 4a in a rocking manner with respect to the support shaft, the inner tube 5 is fitted onto the support shaft, and a member such as E-block of the base end of the swing arm 103 is fitted onto the outer tube 6. And, a voice coil motor (VCM) is mounted on part of the member such as E-block to drive or rock the swing arm 103. In this state, the head 102 (FIG. 1) supported at the tip end of the swing arm 103 and close to the surface of the hard disk 101 (FIG. 1) moves complying with the surface of the hard disk 101 for signal reading and recording as the swing arm 103 rocks.

Recently, because of higher density achieved in memory devices such as HDDs, the width of the tracks on which signals are recorded for the hard disk 101 or flexible disk has become narrower. And the speed of reading and recording of the magnetic memory has become higher. Since the head 102 must trace at high speed and precisely the track having the very narrow width, the positioning precision and rocking speed corresponding to the rocking displacement of the swing arm 103 must be improved. To answer this need, the higher rigidity in the rolling bearing units 104, 4a, specifically the higher radial rigidity taking the rocking direction of the swing arm into consideration is required. However, it is difficult for the conventional rolling bearing units 104, 4a to satisfy the need.

Figure 4:
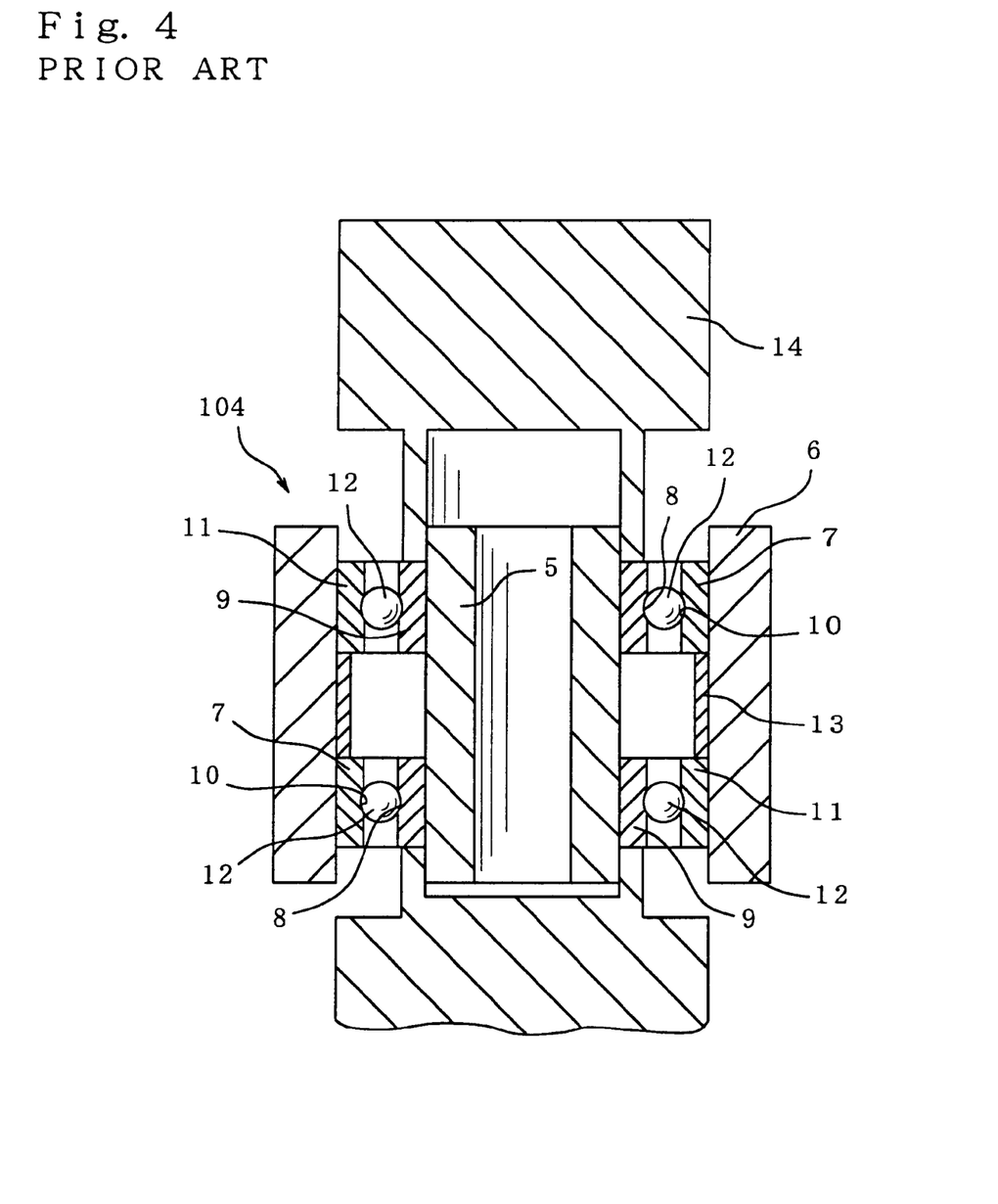
FIG. 4 is a cross sectional view to show an example of the conventional production methods.

There may be a variation in the pre-load applied to the pair of ball bearings 7 of the conventional rolling bearing units 104, 4a. Accordingly, in mass production of the rolling bearing units 104, 4a, the individual units may have larger or smaller radial rigidity. Specifically, when a predetermined axial load is applied to the ball bearings 7, for example with the dead weight 14 as shown in FIG. 4, the pre-load obtained is easily affected by the processing error of the inner ring raceway 8, outer ring raceway 10 and balls 12. More specifically, there are variations in the rate of curvature of the raceways 8, 10 and in the radial clearance based on the processing error of the inner ring raceway 8, outer ring raceway 10 and balls 12. And, if the predetermined axial load is always applied without taking into consideration these variations, the pre-load may be displaced out of the optimum range.

In addition, in the case of the rolling bearing unit 104 where the ball bearings 7 are fixed with adhesive while the predetermined axial load is applied, it is inconvenient to measure the pre-load applied to the ball bearings 7. Specifically, in order to determine whether the optimum pre-load is applied to the ball bearings 7, the axial resonance frequency of the rolling bearing unit 104 is measured after the assembly of the rolling bearing unit 104 is completed, by applying impact it in the free state (impact vibrating). Since the measurement step and the assembly step are separated from each other, the production process of the rolling bearing unit 104 is complicated, which increases the production cost.

On the other hand, in the case of assembling the rolling bearing unit 4a while the axial resonance frequency is applied as shown in FIG. 5, since the measurement step of the axial resonance frequency is made simultaneously with the assembly step, the production cost is lower. However, the variation in preload based on the processing error as mentioned above could not be avoided, and the individual units may have larger or smaller radial rigidity, that is there may be a variation in radial rigidity.

In order to clarify this point, the inventor examined the relation between the pre-load, axial rigidity and radial rigidity with respect to the rolling bearing unit having a pair of ball bearings with larger radial clearance and the rolling bearing unit having a pair of ball bearings with smaller radial clearance.

Figure 6:
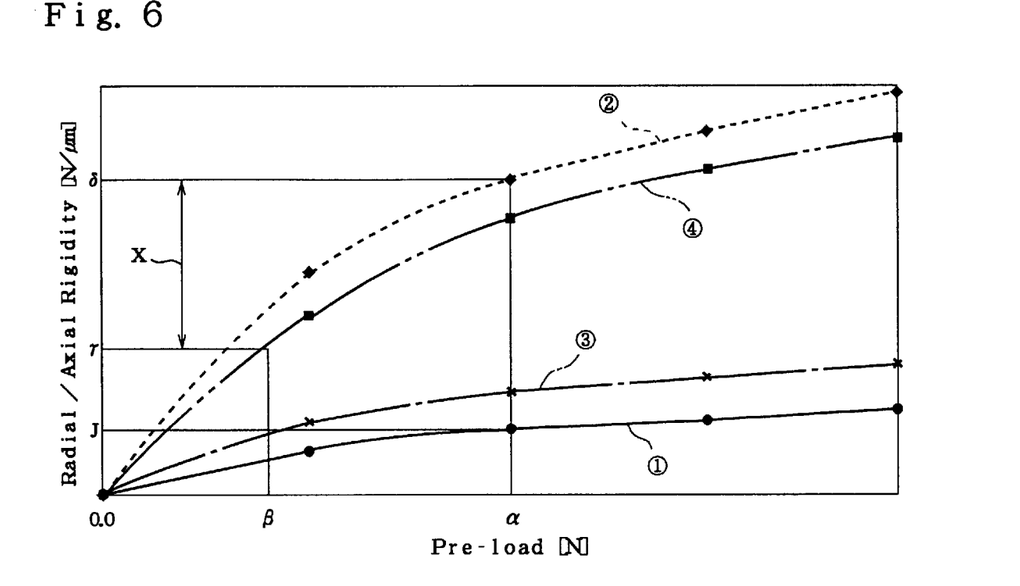
FIG. 6 is a graph to show a relationship between the pre-load applied to a pair of ball bearings, and the radial rigidity, axial rigidity and radial clearance of a rolling bearing unit with the ball bearings installed therein.

The result is explained referring to FIG. 6.

In FIG. 6, the solid line ① indicates the axial rigidity of a rolling bearing unit having a pair of ball bearings with smaller radial clearance, and the dotted line ② indicates the radial rigidity of the rolling bearing unit having the pair of ball bearings with the smaller radial clearance.

In addition, the single-dot chain line ③ indicates the axial rigidity of a rolling bearing unit having a pair of ball bearings with larger radial clearance, and the two-dot chain line ④ indicates the radial rigidity of the rolling bearing unit having the pair of ball bearings with the larger radial clearance. As clear from FIG. 6, the axial rigidity or the axial resonance frequency corresponding to the axial rigidity is at a fixed value, the values in radial rigidity may be largely different depending on the size of the radial clearance.

Specifically, when the pair of ball bearings with the smaller radial clearance and the pair of ball bearings with larger radial clearance are installed respectively with the same axial resonance frequency corresponding to the axial rigidity J, for example, the pre-load applied to the ball bearings with smaller radial clearance is at the value "α" corresponding to the solid line ①, and the pre-load applied to the ball bearings with larger radial clearance is at the value "β" corresponding to the single-dot chain line ③. As to the radial rigidity of the ball bearings corresponding to the pre-loads "α" and "β", the radial rigidity of the ball bearings with larger radial clearance is at the value "γ" corresponding to the two-dot chain line ④, and the radial rigidity of the ball bearings with smaller radial clearance is at the value "δ" corresponding to the dotted line ②.

Accordingly, although the axial rigidity (axial resonance frequency) is constant, the larger in radial clearance the smaller in radial rigidity, and the smaller in radial clearance the larger in radial rigidity, resulting in that there may be a variation in radial rigidity by the difference "X" between the "γ" and "δ" Accordingly, during mass production of the rolling bearing unit with the axial rigidity (axial resonance frequency) fixed at the value "J", there may be a variation between the values "γ" and "δ" in the radial rigidity of the rolling bearing unit depending on the size of radial clearance in the ball bearings caused by processing error etc.

Although there may be a way to make the radial clearance as small as possible by improving the process precision of the inner ring raceway 8, outer ring raceway 10 and balls 12 so as to decrease the variation as mentioned above, it is not desirable due to increase in process time and cost etc.

SUMMARY OF THE INVENTION

Taking the aforementioned problems into consideration, it is an object of this invention to provide a rolling-bearing unit and an assembly method for that rolling-bearing unit that is simple as well as low cost, and which further makes the radial rigidity more uniform and more rigid by reducing the variation in the radial rigidity between individual parts.

Another object of this invention is to provide a rolling bearing unit stably at a lower cost, with its radial rigidity controlled at a desired value, such that the variation in radial rigidity is very small even in mass production.

DESCRIPTION OF THE PREFERRED EMBODIMENTS

In order to accomplish the objects, when assembling the rolling-bearing unit according to one feature of the invention, the tolerance range of the radial clearance or contact angle of bearings is divided into a plurality of divisions, and a pair of bearings is selected from the same division, and a pre-load, which is set according to the division, is applied to the selected pair of bearings as they are installed in a unit.

In this way, it is possible to more greatly reduce the variation in radial rigidity between individual parts than in the conventional case of selecting a pair of bearings from within a range without dividing the current tolerance range and then applying a single set pre-load to these bearings during installation. Also, by reducing the variation in radial rigidity between individual parts in this way, it becomes possible to increase the precision of the positioning function for the rolling-bearing unit for the swing arm.

Moreover, by reducing the variation in radial rigidity, it is possible to better keep the radial rigidity from going lower than the target value than in the case when there is a large variation in radial rigidity, and as a result, it is possible to further increase the radial rigidity. Also it is possible to better keep the radial rigidity from going higher than the target value than in the case when there is a large variation in radial rigidity, so it is possible, for example, to keep the driving torque from becoming larger than necessary.

Furthermore, since it is possible to reduce the variation in radial rigidity between individual parts while at the same time maintain the current processing precision for the radial clearance and for the rate of curvature of the groove in the inner and outer races, it is possible to further increase radial rigidity and improve positioning precision while at the same time keep the rolling bearing unit simple and low cost.

The present invention is capable of using an assembly method for the rolling-bearing unit in which, when assembling the rolling-bearing unit, the tolerance range of the radial clearance or contact angle of bearings is divided into a plurality of divisions, and a pair of bearings is selected from the same division, and a pre-load, which is set according to the division, is applied to the selected pair of bearings as they are installed in the unit.

A first embodiment of the invention will be explained based on the accompanying drawings.

Figure 10:
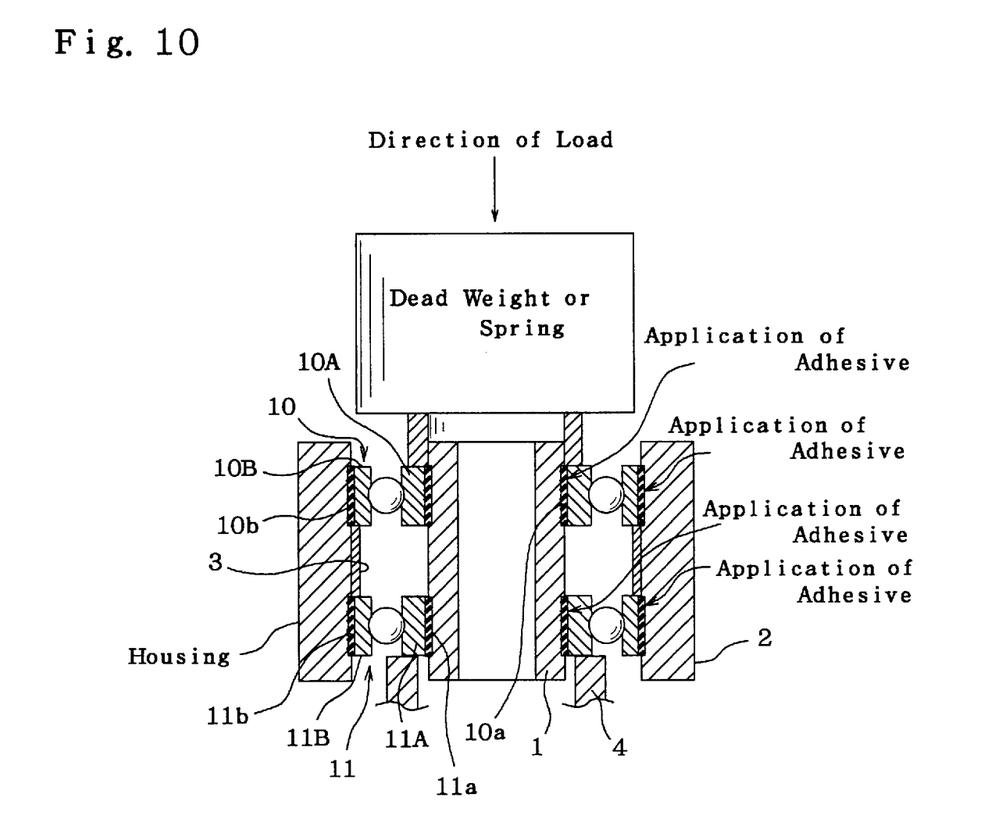
FIG. 10 is a cross sectional view of a ball bearing unit according to an embodiment of the present invention.
Figure 11:
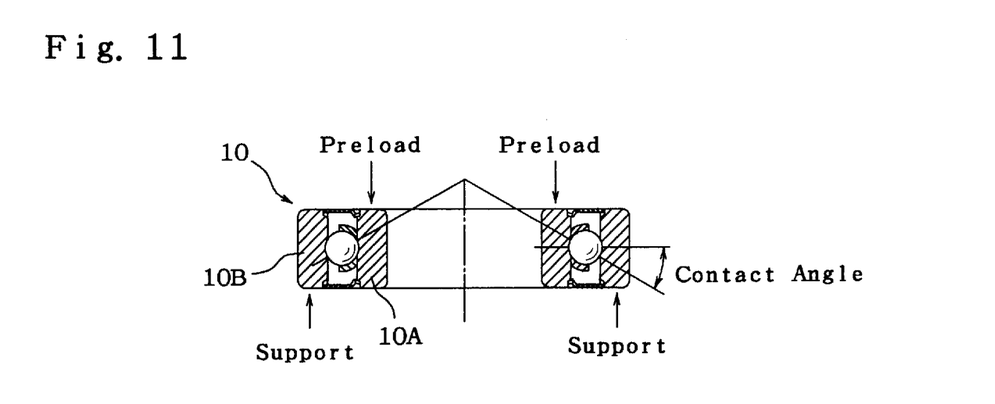
FIG. 11 is a view to show a contact angle of the ball bearing unit of FIG. 10.

FIG. 10 and FIG. 11 show a rolling-bearing unit of an embodiment of the invention. The overall construction is substantially the same as for the prior construction shown in FIG. 3, so only parts that differ will be explained. The same code numbers will be given to the elements that are the same as in the prior apparatus shown in FIG. 3.

In FIG. 10, the inner races 10A, 11A of a pair of ball bearings 10, 11 are fitted around the outer periphery of the shaft 1 (held by adhesive or pressure fit), and the outer races 10B, 11B of this pair of ball bearings 10, 11 are fitted around the inner peripheral surface of a housing 2 (held by adhesive or pressure fit).

Similar to the method described on FIG. 3, in one example of the assembly method for the bearing unit of this embodiment, a specified load is applied to the upper end surface of the inner race 10A using a dead weight or spring force, while supporting the lower end surface of the inner race 11A with a jig 4, then the positions of the outer races 10B, 11B are fixed using a spacer 3, and in doing so a specified pre-load is applied by bringing the inner race 10A relatively close to the inner race 11A.

Then, while applying this specified pre-load, the outer peripheral portion of the shaft 1 is fastened to the inner peripheral surfaces 10a, 11a of the inner races 10A, 11A using adhesive or a pressure fit, and the inner peripheral portion of the housing 2 is fastened to the outer peripheral surfaces 10b, 11b of the outer races 10B, 11B, also using adhesive or a pressure fit.

Figure 12:
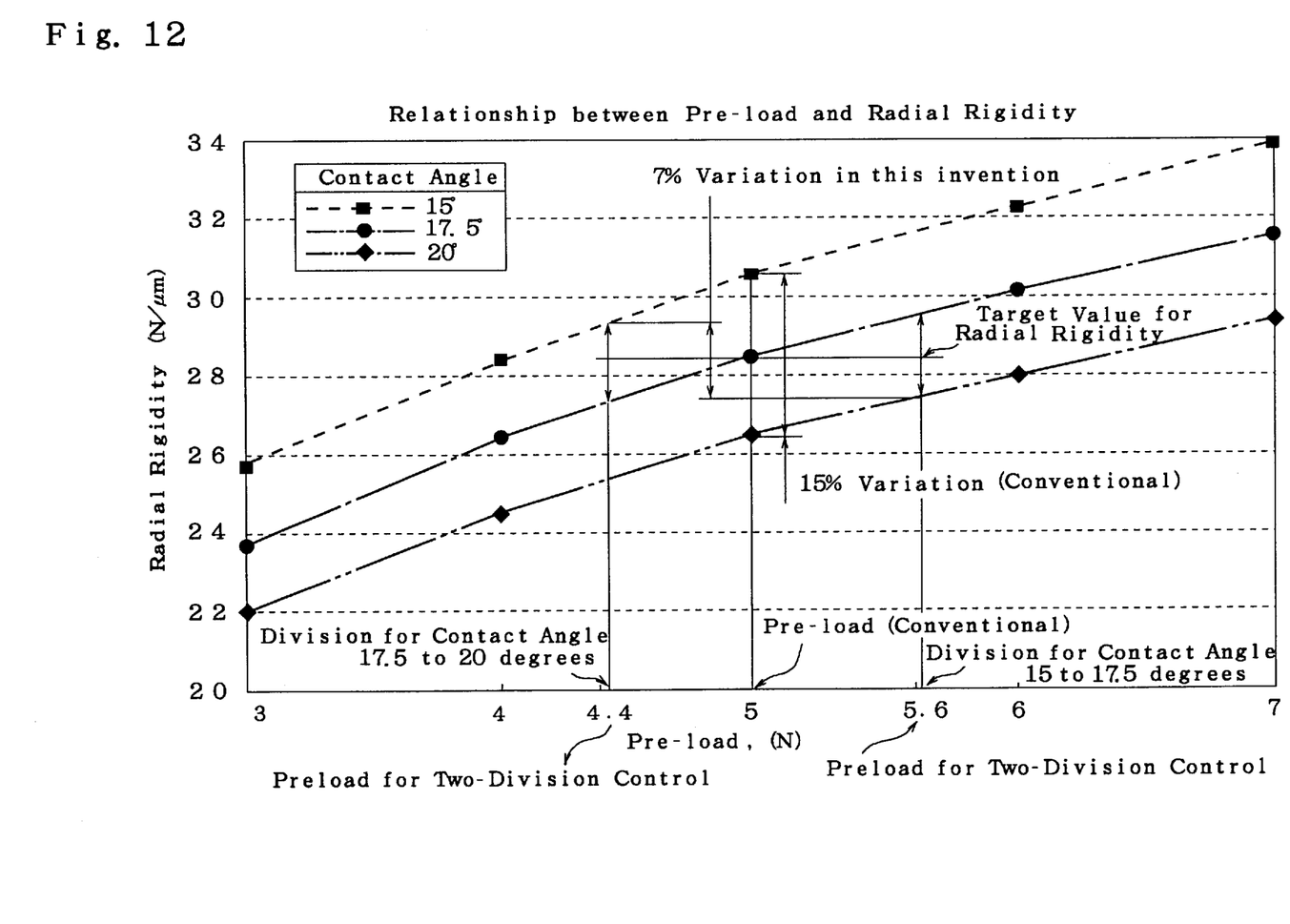
FIG. 12 is a graph to explain a relationship between the preload and the radial rigidity for different contact angles (radial clearances).

The radial clearance for the prior art bearing is 13 to 20 μm (this is a radial clearance for a miniature bearing, and is a typical range for a radial clearance in mass production), and using this to calculate the contact angle (see FIG. 11), the contact angle is 15 to 20 degrees as shown in FIG. 12 (having a 5-degree width of tolerance). Here, when a 5N pre-load is applied, the ratio of the variation range in the radial rigidity (in other words, the difference between the maximum and minimum values) to the median (target value) in the range is approximately 15% (see FIG. 12).

In this embodiment, the tolerance range of the typical radial clearance of the prior art bearing is divided into two divisions, and a pair of bearings is selected from the same division, and when installing the selected bearings, a pre-set pre-load that corresponds to that division is applied.

In other words, the current tolerance range is divided into two divisions, and a pair of bearings is selected from the same division, and then it is possible to reduce the prior art tolerance for contact angle of 5 degrees (absolute value range of 15 to 20 degrees) to 2.5 degree (absolute value range of 15 to 17.5 degrees, 17.5 to 20 degrees).

By changing the pre-load applied to each division in order that the desired radial rigidity (the target value for the radial rigidity is fixed regardless of division) can be obtained, specifically such a small pre-load (for example 4.4N) can be applied to the bearing selected from the division having a small contact angle (15 to 17.5 degrees), and a large pre-load (for example 5.6N) can be applied to the bearing selected from the division with a large contact angle (17.5 to 20 degrees) as shown in FIG. 12, so it is possible to decrease the range of variation in radial rigidity to approximately 7%.

In other words, by dividing the tolerance range of the radial clearance of the bearing into two divisions, then selecting a pair of bearings from the same division and installing the selected pair of bearings in a unit, as in the case of this embodiment, when a pre-load is applied to the bearings that has been uniquely preset for the division, it is possible to reduce the variation in radial rigidity between individual parts by approximately ½ when compared with the case of applying a single fixed pre-load to the bearings when installing the bearings in a unit (see FIG. 12). Also, by reducing the variation in radial rigidity between individual parts in this way, it is possible to increase the precision of the positioning function of the bearing unit for a swing arm.

Moreover, by reducing the variation in radial rigidity, it is possible to better keep the radial rigidity from becoming lower than the target value (low rigidity) than in the case of large variation in rigidity, so it is possible to further increase the radial rigidity. Conversely, by reducing the variation in radial rigidity, it is possible to better keep the radial rigidity from becoming higher than the target value (high rigidity) than in the case of large variation in rigidity, so, for example, it is possible to keep the driving torque from becoming larger than necessary.

Furthermore, with this embodiment of the invention, it is possible to reduce the variation in radial rigidity between individual parts while at the same time maintain the current state of process precision of the radial clearance and of the rate of curvature of the groove in the inner and outer races, so it is possible to provide a rolling bearing unit having increased rigidity and positioning precision, while at the same time keep the rolling bearing unit simple and low cost.

With the rolling-bearing unit that is assembled using the assembly method for a rolling-bearing unit of this embodiment, it is possible to reduce the variation in radial rigidity between individual parts, so when it is used in the bearing unit for a swing arm, it is possible to improve the precision of the positioning function of the bearing unit. Also, since the variation in radial rigidity is reduced, it is possible to better keep the radial rigidity from shifting toward the lower limit from the target value (to the low rigidity side) than in the case of large variation in radial rigidity, and as a result it is possible to further increase the radial rigidity. On the other hand, when the variation in the radial rigidity is reduced, it is possible to better keep the radial rigidity from shifting from the target value toward the upper limit (to the high rigidity side) than in the case when the variation in radial rigidity is high, for example, it is possible to keep the drive torque from become greater than necessary. Furthermore, since it is possible to reduce the variation in radial rigidity between individual parts while at the same time maintain the current state of processing precision of the radial clearance and of the rate of curvature of the groove in the inner and outer races, it is possible to increase the radial rigidity and improve the positioning precision, while at the same time keep the rolling bearing unit simple and low cost.

This embodiment was explained for the case when the tolerance range of the radial clearance was divided into two divisions, and a pairs of bearings were selected from within the same division and the selected pair of bearings were installed in the rolling bearing unit, and where a pre-load that was uniquely set for each division was applied, however, the invention is not limited to this, and it is possible to divide the tolerance range of the radial clearance into three or more divisions, and to select a pair of bearings from within the same division and install the selected pair of bearings in the rolling bearing unit and apply a pre-load that has been uniquely set for the division. In so doing, it is possible to further reduce the variation in the radial rigidity, and thus further increase the radial rigidity and improve the positioning precision, while at the same time keep the rolling bearing unit simple and low cost.

The aforementioned embodiment was explained as a way of control by dividing the tolerance range of the radial clearance into a plurality of divisions, however, the contact angle has a geometrical relationship with the radial clearance and with the rate of curvature of the groove, so of course it is possible to control the divisions by either the radial clearance or the contact angle.

As was described above, regardless of whether or not adhesive is used, it is possible to press-fit and fasten the outer periphery of the shaft 1 inside the inner races 10A, 11A of the pair of ball bearings 10, 11, and to fasten the inner peripheral surface of the housing 2 to the outer races 10B, 11B of the pair of ball bearings 10, 11, however, in the case of press-fitting, it is possible to use a so-called resonance press-fitting method in which the vibration of the housing 2 is monitored while applying vibrating and press-fitting the shaft 1 inside the inner races 10A, 11A.

In addition, in this embodiment, a ball bearing unit was explained, however, the invention is not limited to this and it is also possible to apply the invention to a roller-bearing unit, or other kind of rolling-bearing unit. Also, in this embodiment, a bearing unit for a swing arm was explained, however, the invention is not limited to this and can also be applied to bearing units for other purposes.

As explained above, in the rolling-bearing unit of this invention, the tolerance range of the radial clearance is divided into a plurality of divisions, and a pair of bearings is selected from within the same division and when the selected pair of bearings is assembled, a pre-load that has been set uniquely for the division is applied, so it is possible to more greatly reduce the variation in radial rigidity between individual parts than in the conventional case of selecting a pair of bearings within the current tolerance range and applying a single pre-load when assembling those bearings. Also, by reducing the variation in radial rigidity between individual parts, it is possible to improve the precision of the positioning function of the rolling-bearing unit for a swing arm.

Moreover, by reducing the variation in the radial rigidity, it is possible to keep the radial rigidity from shifting from the target value toward the lower limit better than in the case of when there is a large variation in the radial rigidity, so as a result it is possible to increase the radial rigidity, and it is possible to keep the radial rigidity from shifting from the target value toward the upper limit better than in the case of when there is a large variation in the radial rigidity, for example, it is possible to keep the drive torque from becoming larger than necessary.

Furthermore, with a rolling-bearing unit that is assembled according to the assembly method of this invention, it is possible to reduce the variation in the radial rigidity between individual parts, while at the same time maintain the current state of processing precision of the radial clearance and of the rate of curvature of the groove in the inner and outer races, and thus it is possible to increase the radial rigidity and improve the positioning precision, while at the same time keep the rolling-bearing unit simple and low cost.

The rolling bearing unit produced by the production method in another feature of the present invention comprises, similar to the conventional rolling bearing unit as mentioned above, an inside member, an outside member provided around the inside member, and a pair of ball bearings having their outer races fixed on the inner peripheral surface of the outside member at two locations axially separated from each other and their inner races fixed on the outer peripheral surface of the inside member at two locations axially separated from each other.

In the method of producing the rolling bearing unit of the present invention, while the axial resonance frequency of the rolling bearing unit is measured, ball bearings are pressed into between the inside member and the outside member, and fixed when the axial resonance frequency has reached a predetermined value.

In the method of producing the rolling bearing unit of the present invention, the ball bearings prepared are divided into at least two divisions depending on the size of radial clearance. In addition, the axial resonance frequency is predetermined for the respective divisions. And a pair of ball bearings are selected from the same division and fixed between the inside member and the outside member based on the predetermined axial resonance frequency according to the division.

The predetermined axial resonance frequency when fixing the ball bearings in the division where the radial clearance is larger is higher than the predetermined axial resonance frequency when fixing the ball bearings in the division where the radial clearance is smaller.

The radial clearance is the value obtained by subtracting the outer diameter of the inner ring raceway and twice the diameter of the balls from the inner diameter of the outer ring raceway. With the radial clearance known, the contact angle is obtained geometrically from the size of the parts of the ball bearings. Accordingly, when practicing the present invention, dividing the ball bearings into at least two divisions depending on the sizes of the contact angle is substantially the same to dividing the ball bearings into at least two divisions depending on the sizes of the radial clearance. It is desirable to either one of the radial clearance and the contact angle which is easy to measure and hardly to cause errors. From this point, use of the radial clearance is desirable. In the present specification, unless otherwise expressed, the term "radial clearance" include the meaning of contact angle. Further, when the ball bearings are of the single row, deep groove type, and when the variation of the radius of curvature of the cross sectional shape of the outer ring raceway and inner ring raceway can be neglected, the same thing can be mentioned on the axial clearance and angular clearance.

The rolling bearing unit produced by the method according to the present invention as mentioned above comprises a set of ban bearings selected from the same division with respect to the radial clearance in a predetermined size range. In addition, with the axial resonance frequency predetermined depending on the division, the ball bearings are provided with a proper pre-load.

Consequently, the radial rigidity of the rolling bearing unit can be controlled to a proper value. As a result, in mass production, the variation is hardly caused, and it is possible to stably provide a rolling bearing unit with sufficient rotation precision secured.

Since there is no need of keeping the process precision of inner ring raceway, outer ring raceway and balls high, the production cost of the rolling bearing unit can be kept from increasing.

The following is an explanation on the test calculation conducted by the inventor.

Taking into consideration the tolerance of the actual ball bearing, a ball bearing with the radial clearance of 16 $\mu$m and with the tolerance range of ±3 $\mu$m is adopted for the test calculation. This is within the radial clearance between 13 to 19 m which corresponds to the contact angle between 15 to 20 degrees. Then, the relations between the radial clearance of the ball bearing, and the axial rigidity and radial rigidity of the rolling bearing unit are examined. The result is shown in FIG. 7.

Figure 7:
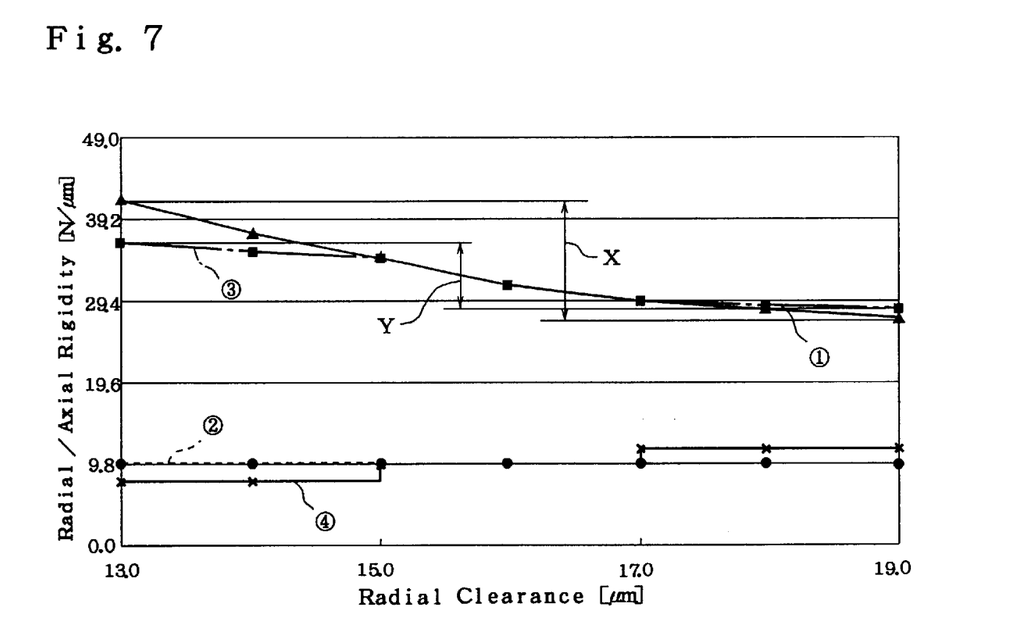
FIG. 7 is a graph to show a result of the test calculation to confirm the results of the present invention.

In FIG. 7, the solid line ① indicates the relation between the radial clearance of the ball bearings 7 and the radial rigidity of the rolling bearing unit 4a in the case where the axial rigidity (axial resonance frequency) is fixed. Specifically, the solid line ① indicates the radial rigidity in the case where regardless of the variation in the radial clearance, the axial rigidity is 9.8 N/$\mu$m (1.0 kgf/um) as shown by the dotted line ②, in other words in the case where the ball bearings 7 are fixed between the inner tube 5 and the outer tube 6 with the fixed axial resonance frequency corresponding to the axial rigidity.

As noted from the solid line ① and the dotted line ②, the radial rigidity of the rolling bearing unit 4a in mass production, using the ball bearings 7 with the radial clearance between 13 to 19 $\mu$m and controlling the axial rigidity at 9.8 N/$\mu$m, is varied in the range indicated by the arrow X in FIG. 7. The range in which the radial rigidity is varied, specifically the rate of the difference between the maximum and minimum of the radial rigidity to the median is 40%.

On the other hand, the chain line ③ indicates the relations between the radial clearance of the ball bearings 7 and the radial rigidity of the rolling bearing unit 4a in the case where by dividing the radial clearance in three divisions (13 to 15 $\mu$m, 15 to 17 $\mu$m and 17 to 19 $\mu$m), and where the axial rigidity (axial resonance frequency) is different from division to division. Specifically, the solid line ④ indicates the radial rigidity in the case where the axial rigidity is smaller than 9.8 N/$\mu$m when the radial clearance is between 13 and 15 m, where the axial rigidity is 9.8 N/$\mu$m when the radial clearance is between 15 and 17 μm, and where the axial rigidity is larger than 9.8 N/μm when the radial clearance is between 17 and 19 μm.

As noted from the chain line ③ and the solid ④, the radial rigidity of the rolling bearing unit 4a in mass production, using the ball bearing 7 with the radial clearance between 13 to 19 μm and changing the axial rigidity (axial resonance frequency) depending on the size of the radial clearance, is in the range indicated by the arrow Y. The variation range of the radial rigidity is 22%, about a half of the value in the case where the axial rigidity is fixed as mentioned above.

Accordingly, the ball bearings 7 for the bearing units are divided into at least two divisions depending on the size of radial clearance (three in the above case), and the axial resonance frequency (axial rigidity) is determined differently for each division, and then a pair of ball bearings 7 is selected from the same division and fixed based on the predetermined axial resonance frequency (axial rigidity). Consequently, the variation in radial rigidity can be controlled. Specifically, a pair of ball bearings 7 are selected from the same division with respect to the radial clearance and installed in the rolling bearing unit 4a, and fixed between the inner tube 5 and the outer tube 6 at the predetermined axial resonance frequency (axial rigidity) differently provided for the respective divisions. Consequently, a proper pre-load can be applied to the ball bearings 7, and the radial rigidity of the rolling bearing unit 4a can be controlled at a proper value. As a result, in mass production, the radial rigidity is hardly varied, and the rolling bearing unit 4a with rotation precision sufficiently secured is stably provided. In addition, there is no need of keeping the processing precision of inner ring raceway 8, outer ring raceway 10 and balls 12 high, and so the production cost of the rolling bearing unit 4a can be kept from increasing.

It is desirable that the axial resonance frequency when fixing the ball bearings 7 from the division of larger radial clearance is larger than the axial resonance frequency when fixing the ball bearings 7 from the division of smaller radial clearance.

The following is an explanation on the experiments this inventor conducted to confirm the effects obtained in the present invention by changing for the radial clearance of the respective ball bearings 7 the axial resonance frequency which is measured when applying a preload to the ball bearings.

The ball bearings used in the experiments are similar to the ball bearings on which the test calculation above is made, specifically sized in 16 μm of radial clearance, in ±3 μm of tolerance range 13 to 19 μm of radial clearance and 15 to 20 degrees of contact angle). The radial resonance frequency was measured on the rolling bearing units having different axial resonance frequencies for respective size ranges of the radial clearance, specifically, for the respective radial clearance ranges of 13 to 15 μm, 15 to 17 μm and 17 to 19 μm, and on the rolling bearing units having different radial clearances but an identical axial resonance frequency. This measurement was conducted using the measurement apparatus as shown in FIG. 8.

Figure 8:
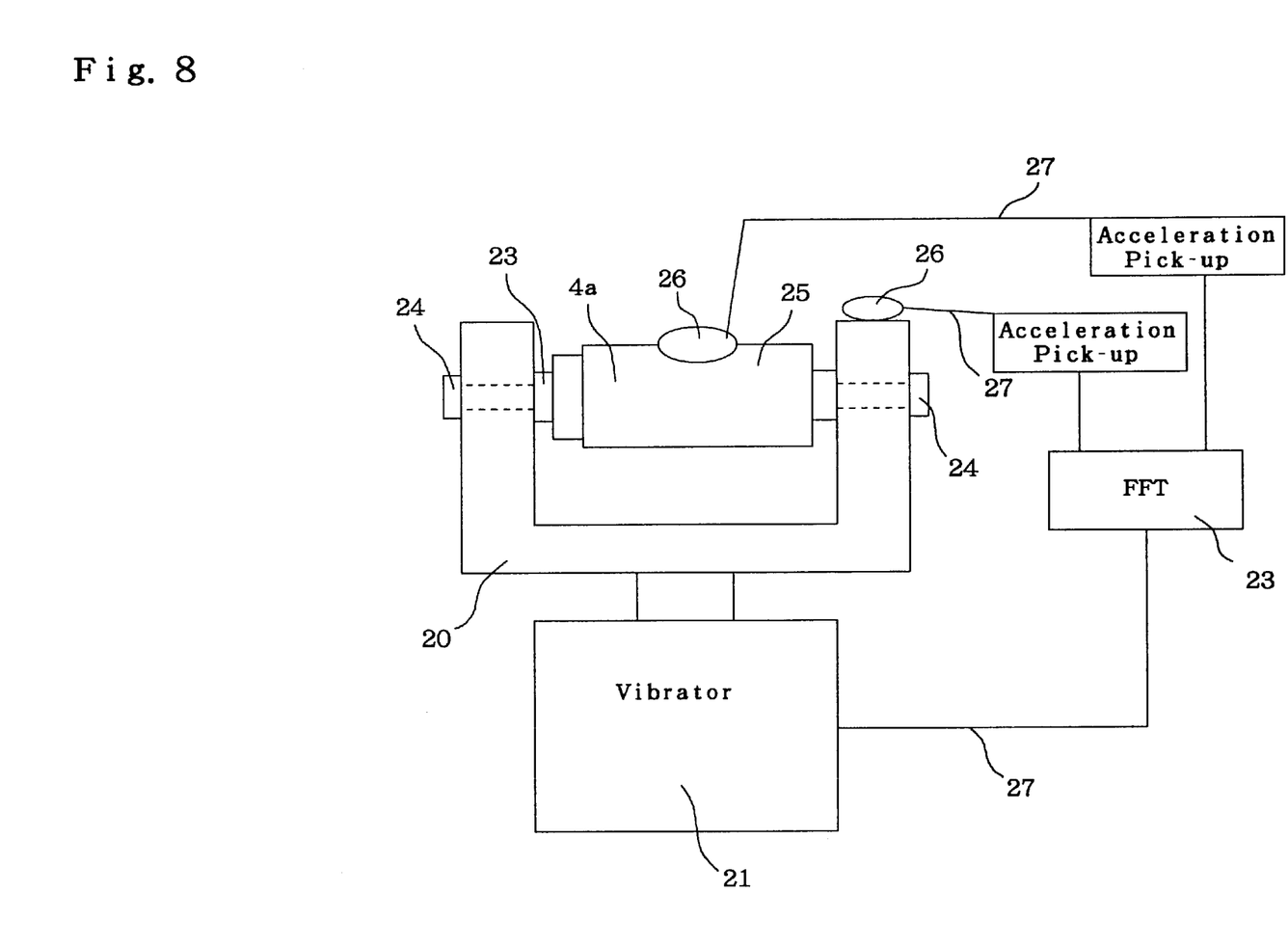
FIG. 8 is a view to show a measurement apparatus used to confirm the results of the present invention.

The measurement apparatus shown in FIG. 8 comprises a frame 20 to which the rolling bearing unit 4a is fixed, a vibrator 21 for vibrating the frame 20, and an FFT converter 23 for conducting the Fast Fourier Transform. The opposite ends of the rotating shaft 23 which is an inside member of the rolling bearing unit 4a are fixed to the frame 20 with screws 24, and acceleration speed sensors are mounted to the frame 20 and the housing 25 which is an outside member. With the vibrator 21, the rolling bearing unit 4a is vibrated in its radial directions. In this state, the signals from the accelation sensors 26 mounted to the frame 20 and to the housing 25, and the signals from the vibrator 21 are input to the FFT convertor 23 through cables 27. Then, from the signals, the vibration component of the frame 20 is cancelled, and the vibration component in the radial direction of the rolling bearing unit 4a is taken out to measure the radial resonance frequency which is a peak of the radial vibrations. The results are shown in FIG. 9.

Figure 9:
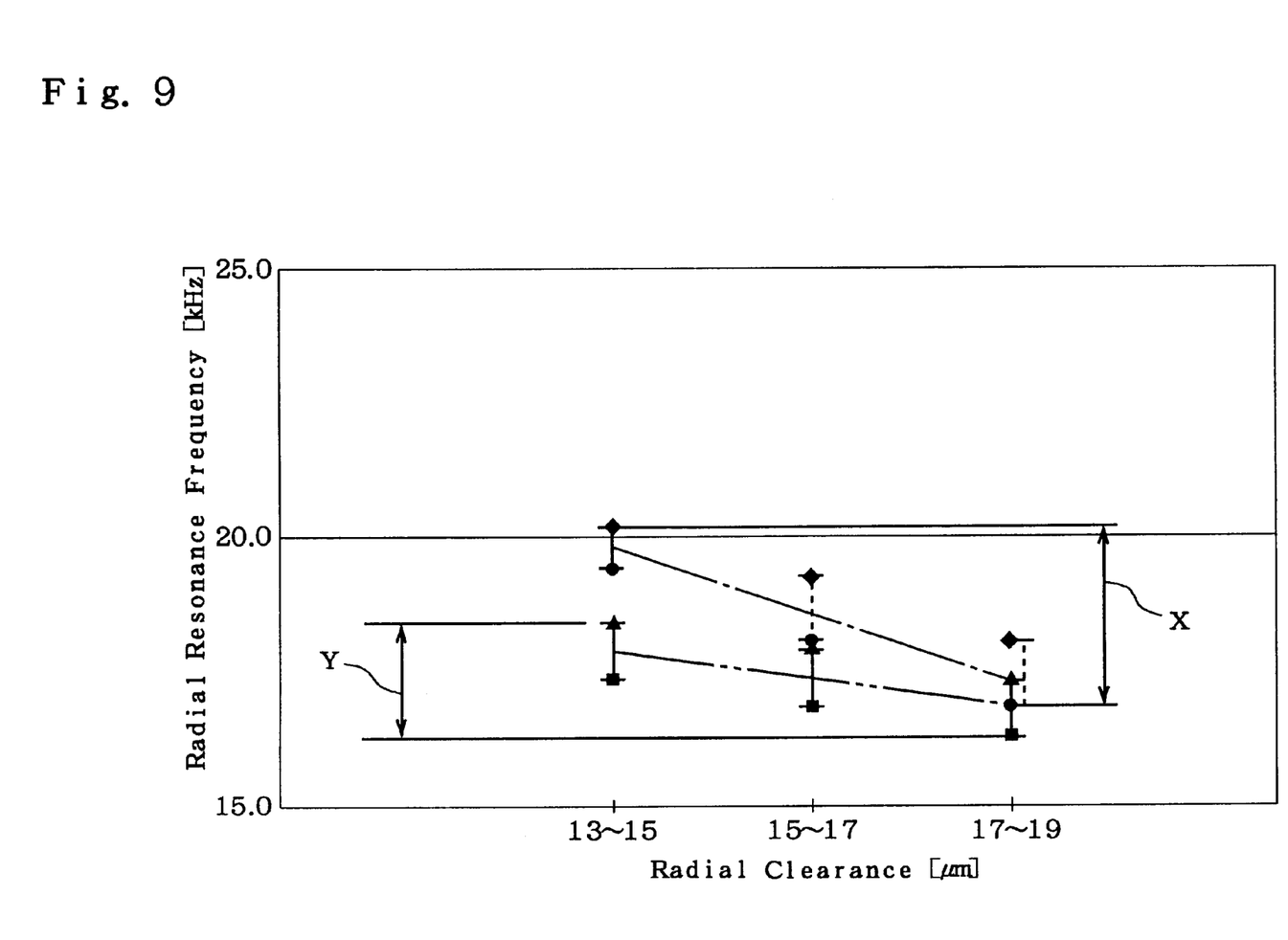
FIG. 9 is a graph to show a test result obtained by the measurement apparatus of FIG. 8.

In FIG. 9, the solid line indicates the range of the radial resonance frequency of the rolling bearing units 4a which are provided with different axial resonance frequencies for the radial clearances of the respective ball bearings, and on the other hand, the dotted line indicates the range of the radial resonance frequency of the rolling bearing units 4a which are assembled with a fixed axial resonance frequency regardless of the different radial clearances of the respective ball bearings.

As clear in FIG. 9, the variation range in radial resonance frequency in the rolling bearing units 4a assembled with the different axial resonance frequencies provided for the respective radial clearance divisions is smaller than in the rolling bearing units 4a assembled with the fixed axial resonance frequency regardless of different radial clearances. Specifically, the variation range of the radial resonance frequency of the rolling bearing units 4a assembled with the fixed axial resonance frequency, that is the ratio of the value X of maximum minus minimum of the radial resonance frequencies to the median is 18%. On the other hand, the variation range of the radial resonance frequencies of the rolling bearing units 4a assembled with the different axial resonance frequencies for the respective sizes of radial clearance, that is Y, to the median is 10% as shown in FIG. 9.

With the present invention, the rolling bearing unit wherein the radial rigidity is controlled at a desired value, and wherein the variation in radial rigidity is very small even under mass production can be stably provided with a lower cost. As a result, the positioning precision of the swing arm etc. is improved. And the cost of the HDDs in which the swing arm is installed can be reduced.

What is claimed is:

1. A method of producing rolling-bearing units, comprising the steps of:

providing a plurality of bearings to be installed into said rolling-bearing units, each bearing having a radial clearance or contact angle in a tolerance range, defining divisions in the tolerance range, each division having a different range of radial clearance or contact angle of the bearings, distributing said plurality of bearings into the different divisions depending on the radial clearance or contact angle thereof, selecting a pair of bearings from the same divisions, and applying a pre-load, which is set according to the same divisions, to the selected pair of bearings as they are installed in the rolling-bearing units so as to reduce the variation in radial rigidity and improve positioning precision in said rolling-bearing units.

2. The method of claim 1, wherein the number of different divisions is two.

3. The method of claim 1, wherein the number of different divisions is greater than two.

4. A method of producing rolling bearing units comprising an inside member having an outer peripheral surface, an outside member provided around the inside member and having an inner peripheral surface, and a pair of ball bearings each having outer and inner races, such that the outer races are fixed on the inner peripheral surface of the outside member at two locations axially separated from each other and that the inner races are fixed on the outer peripheral surface of the inside member at two locations axially separated from each other, the method comprising the steps of:

preparing a plurality of ball bearings which are divided into at least two different divisions in a tolerance range, each division defined by the size of radial clearance or contact angle of the ball bearings, selecting a pair of ball bearings from the same divisions, measuring axial resonance frequency of the rolling bearing units and simultaneously pressing ball bearings between the inside member and the outside member, and fixing the ball bearings when the axial resonance frequency under measurement has reached a predetermined value which is differently preset according to the respective divisions defined by the size of the radial clearance or contact angle of the ball bearings so as to reduce the variation in radial rigidity and improve positioning precision in said rolling bearing unit.

5. The method of claim 4, wherein the predetermined axial resonance frequency when fixing the ball bearings selected from the division where the radial clearance is larger is higher than the predetermined axial resonance frequency when fixing the ball bearings selected from the division where the radial clearance is smaller.

6. The method of claim 4, wherein the number of different divisions is two.

7. The method of claim 4, wherein the number of different divisions is greater than two.

* * * * *